March 6, 1934.  A. HUGUENIN  1,950,305
DISTRIBUTOR CONTROL FOR HYDRAULIC REVERSING TURBINES
Filed Feb. 5, 1932  2 Sheets-Sheet 1
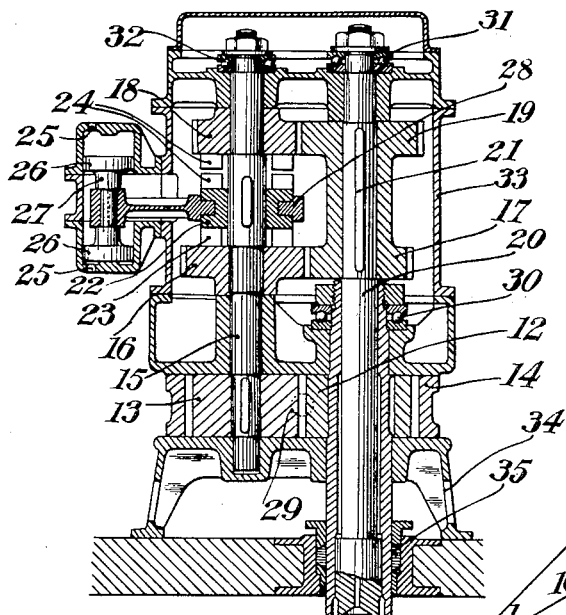
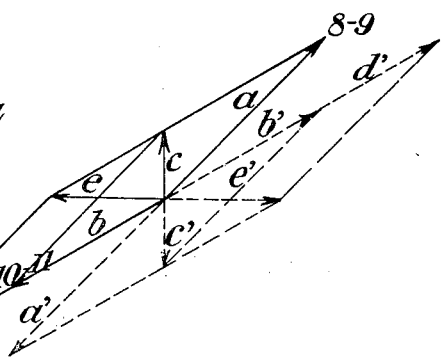
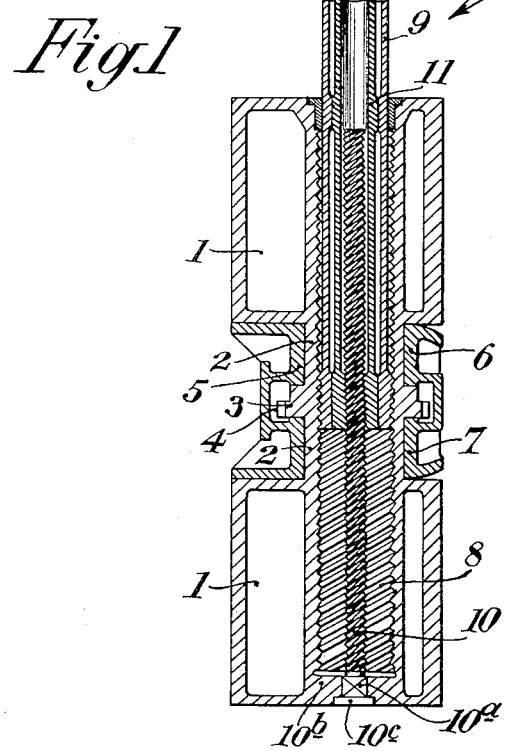
A. Huguenin
INVENTOR
By: Marks & Clerk
ATTYS.

March 6, 1934.   A. HUGUENIN   1,950,305

DISTRIBUTOR CONTROL FOR HYDRAULIC REVERSING TURBINES

Filed Feb 5, 1932   2 Sheets-Sheet 2

A. Huguenin
INVENTOR

By Marks & Clerk
ATTYS.

Patented Mar. 6, 1934

1,950,305

UNITED STATES PATENT OFFICE 1,950,305

DISTRIBUTOR CONTROL FOR HYDRAULIC REVERSING TURBINES

Albert Huguenin, Paris, France

Application February 5, 1932, Serial No. 591,188
In France February 14, 1931

2 Claims. (Cl. 253—122)

A distributor for hydraulic reversing turbines must not only ensure the rotation of the guide blades themselves on their axis, in order to control the output of the turbine from complete obturation to its full working open position, but also allow the axial displacement of the entire distributor, that is to say of the whole set of the guide blades and of their tangential ring, and, for that purpose, allow a rotation of about 90° of the guide blades themselves, since the latter must, for the axial movement of translation, be moved into the radial position.

It is moreover very advantageous to shelter all the working elements of this control from the action of water.

The present invention has for object a control device so devised as to completely solve this complex problem.

The accompanying drawings illustrates, by way of example, a form of construction of this control device.

Fig. 1 is a vertical section made along the axis of the distributor, of the ring, of the guide blades and of the control mechanism.

Fig. 2 is an explanatory diagram of working.

Figure 3:
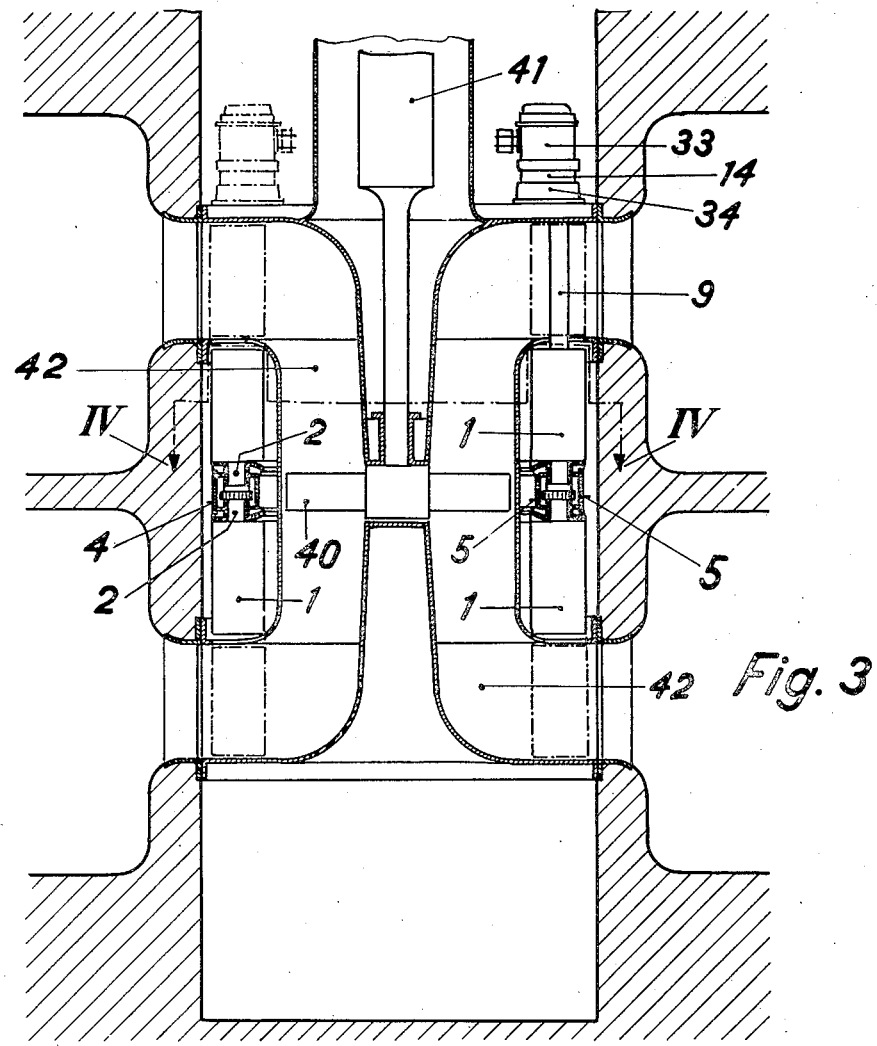
Figure 3 is a diagrammatic view, partly in section, of a hydraulic reversing turbine, showing the distributor control of the present invention mounted therein.
Figure 4:
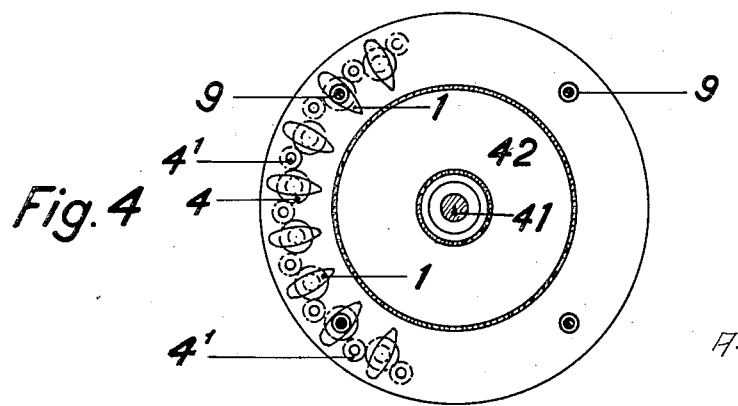
Figure 4 is a sectional view on the line IV—IV of Fig. 3.

The mounting for the reversing turbine shown in Figure 3 is substantially the same as the mounting disclosed in my prior Patent No. 1,648,848, of November 8, 1927. As shown in Fig. 3, the runner 40 corresponds to the runner or driving wheel $a$ of the patent, the driving shaft 41 to the shaft $b$, and the water collecting passages 42 to the volutes $i$ and $k$ of the patent. As these parts are fully disclosed in the patent and form no part of the present invention, a detail description of the same is not necessary.

The guide blades 1 are rigid with a median journal 2 having a central flange 3 provided with a toothed crown 4 and fitting in a ring 5, so that both journals 2 are rigidly held in the axial direction by the flange 3 between two bearings 6 and 7 formed by the ring 5. All the guide blades are by this means rendered rigid, in the axial direction, with the ring 5, and they are also rendered rigid with the same, as far as their movement of rotation about their vertical axis is concerned, by means of the toothed crowns 4 which are connected by intermediate toothed wheels meshing with them. In this way, they are all compelled to simultaneously rotate in one and the same direction, either clockwise or counterclockwise.

It is therefore possible to simultaneously act on one or more guide blades for obtaining both the translation of the entire system in the axial direction and the simultaneous rotation of all the guide blades. This drive will preferably be exerted on three or four guide blades uniformly distributed on the entire circumference.

The axial movement of translation and the movement of rotation are obtained at will by the combination of two screw-threaded rods screwing in nuts and rotating in reverse directions, both pitches being different, and the guide blade itself having a male screw-thread and a female screw-thread of the two above mentioned threaded connections.

In fact, the guide blade 1 has a female screw-thread 8 meshing with the male screw-thread of a hollow shaft 9 and also the male screw-thread of the rod 10 threaded in the nut formed by a hollow shaft 11, this rod 10 being inserted, by means of a part of square cross-section 10a, in the bottom 10b of the guide blade and being secured to the latter by a flange 10c. Both pairs of screw-threads are therefore 8—9 and 10—11.

In order to understand the simultaneous operation of these screws of different pitches 8—9 and 10—11, reference must be made to Fig. 2 in which the arrows corresponding to the pitches and to the speed of translation are respectively designated by 8—9 and 10—11. By judiciously choosing the speeds of rotation 8—9 relatively to 10—11, as indicated by the arrows $a$ and $b$ giving the resultant $c$, a vertical movement of translation without any rotation will be obtained. If, on the contrary, the speeds are designated for 8—9 by $a$, and for 10—11 by $d$, the resultant movement will be the rotation $e$ without any translation.

This diagram shows therefore that for two different and well defined ratios of speed of rotation between these two screws having different pitches, it is possible to obtain either a simple translation or a simple rotation of the guide blades.

By reversing the direction of rotation, either by changing $a$ into $a'$, or $b$ into $b'$, $c$ will become $c'$ and the translation without rotation will take place downwardly instead of taking place upwardly as in the first case.

By maintaining $a'$ and by replacing $b'$ by $d'$, the resultant will still be $e'$, that is to say a rotation without translation in the direction reverse to e of the first case.

The material realization of this diagram is obtained for instance in the following manner:

A single hydraulic servo-motor having toothed wheels 12—13, is arranged in a casing 14, its wheel 12 being rigidly secured on the hollow shaft 9 and its wheel 13 being fast on a solid shaft 15 which transmits its rotation, by means either of the gears 16—17, or of the gears 18—19, to the hollow shaft 11, the upper part 20 of which is solid.

For that purpose, both wheels 17 and 19 are rendered rigid with the shaft 20 by keys 21, whilst both wheels 16 and 18 are loose on the shaft 15 which carries a claw sleeve 22 sliding on a key, and which can be coupled at will, by claws 23, with the wheel 16, or by claws 24, with the wheel 18. This alternate coupling is produced by a servo-motor having a double cylinder 25 the pistons 26 of which and their common rod 27 drive the actuating arm 28 of the said sliding sleeve 22.

In this way, the speed of rotation of the screw 9 is always the same, whilst that of the screw 11 receives, at will, the two values respectively corresponding to b or d of Fig. 2, provided the ratios of the gears 16, 17, 18, 19 are suitably chosen.

The transmission by 16—17, imparting the highest speed to the shaft 20, will correspond to the movement of rotation of the guide blades and the transmission by 18—19, imparting the lower speed, will correspond to the translation of the entire distributor.

By reversing the direction of operation of the servo-motor 12—13, for instance by reversing the direction of passage of the fluid in the conduits for the supply and return of the hydraulic fluid and diagrammatically indicated at 29 (one in front, the other behind the plane of Fig. 1), the directions of rotation will be reversed and by the alternate meshing either of 16—17, or of 18—19, the movements e' and c' will be obtained.

The hollow shaft 9 carries a thrust bearing 30, the shaft 20—11 a thrust bearing 31, and the shaft 15 a thrust bearing 32. A general casing 33 covers the entire change speed gear and the whole rests, by means of a support 34, on a floor. Finally, a stuffing-box 35 renders the shaft 9 fluid-tight at the place it issues from the turbine.

The drawings illustrate only one form of construction, but it is to be understood that the details of the same may be varied without departing thereby from the scope of the invention.

I claim:

1. In a distributor control for hydraulic reversing turbines, the combination of two guide blades, a hollow median journal connecting both guide blades together and internally screw-threaded, a toothed crown on the said journal, a hollow ring in which the said journal is rotatively housed and against which rub the inner sides of these guide blades, a hollow outer externally threaded shaft screwed in the screw-threaded portion of the said hollow journal, a hollow inner shaft rotatively housed in the said hollow outer shaft and internally screw-threaded, a screw-threaded rod secured within the said journal and screwing in the screw-thread of the said inner shaft, the pitch of the said journal and of the said outer shaft, on the one hand, and the pitch of the said inner shaft and of the said screw-threaded rod, on the other hand, being different, and means for imparting to the said outer shaft and to the said inner shaft different speeds of rotation, and for imparting to the said guide blades either a movement of rotation, or an axial movement of translation.

2. In a distributor control for hydraulic reversing turbines, the combination of two guide blades, a hollow median journal connecting both guide blades together and internally screw-threaded, a toothed crown on the said journal, a hollow ring in which the said journal is rotatively housed and against which rub the inner sides of these guide blades, a hollow outer externally threaded shaft screwed in the screw-threaded portion of the said hollow-journal, a hollow inner shaft rotatively housed in the said hollow outer shaft and internally screw-threaded, a screw-threaded rod secured within the said journal and screwing in the screw-thread of the said inner shaft, the pitch of the said journal and of the said outer shaft, on the one hand, and the pitch of the said inner shaft and of the said screw-threaded rod, on the other hand, being different, a hydraulic motor having toothed wheels, one of which is keyed on the said hollow outer shaft, clutch means keyed and sliding on the shaft of the toothed wheel of the said motor, two toothed wheels of different diameters loosely mounted on the shaft of the other toothed wheel of the said motor, two toothed wheels keyed on the said hollow inner shaft and arranged for respectively meshing with the said loosely mounted toothed wheels, and means for connecting the said clutch means sometimes with one sometimes with the other of the said loose toothed wheels.

ALBERT HUGUENIN.